United States Patent
Prouff et al.

(10) Patent No.: US 8,661,251 B2
(45) Date of Patent: Feb. 25, 2014

(54) METHOD AND DEVICE FOR CREATING A GROUP SIGNATURE AND RELATED METHOD AND DEVICE FOR VERIFYING A GROUP SIGNATURE

(75) Inventors: Emmanuel Prouff, Paris (FR); Jean-Bernard Fischer, Le Kremlin Bicetre (FR); Théophane Lumineau, Gommecour (FR)

(73) Assignee: Oberthur Technologies, Colombes (FR)

( * ) Notice: Subject to any disclaimer, the term of this patent is extended or adjusted under 35 U.S.C. 154(b) by 899 days.

(21) Appl. No.: 12/090,484

(22) PCT Filed: Oct. 12, 2006

(86) PCT No.: PCT/FR2006/002300
§ 371 (c)(1),
(2), (4) Date: Apr. 17, 2008

(87) PCT Pub. No.: WO2007/045745
PCT Pub. Date: Apr. 26, 2007

(65) Prior Publication Data
US 2008/0244276 A1    Oct. 2, 2008

(30) Foreign Application Priority Data
Oct. 17, 2005    (FR) ...................................... 05 10571

(51) Int. Cl.
*H04L 9/32*    (2006.01)
*H04L 9/08*    (2006.01)

(52) U.S. Cl.
CPC ............ *H04L 9/0833* (2013.01); *H04L 9/0819* (2013.01); *H04L 9/3278* (2013.01); *H04L 9/3294* (2013.01)
USPC ........... 713/168; 713/170; 713/176; 713/177; 713/181

(58) Field of Classification Search
CPC ........... H04L 9/3255; H04L 9/00; H04L 9/08; H04L 9/0805; H04L 9/0816; H04L 9/0819; H04L 9/0833
USPC ......... 713/150, 153, 155–156, 168, 170, 176, 713/178, 180, 181, 189, 193
See application file for complete search history.

(56) References Cited

U.S. PATENT DOCUMENTS 5,005,200 A  *  4/1991  Fischer ........................... 380/30
6,070,244 A  *  5/2000  Orchier et al. .................... 726/1
(Continued)

OTHER PUBLICATIONS

Stallings, William. "Cryptography and Network Security, Principles and Practice, Third Edition," Pearson Education Inc, 2003, pp. 420-421.*

(Continued)

*Primary Examiner* — Darren B Schwartz
(74) *Attorney, Agent, or Firm* — Young & Thompson

(57) ABSTRACT

A method for creating a group signature of a message to be implemented by a member of a group in a system, the system including a trust authority, the group including at least the member provided with a secure portable electronic entity including storage elements and computing elements wherein are implanted a cryptographic algorithm. The method includes the following steps: generating via the computing elements a signature of the message using a private key common to the members of the group and integrating a data identifying the group member and a temporal data representing a temporal information of the member's membership to the group and of the date of the signature of the message, the private key common to the members of the group, the identifying data and the temporal data being stored in the storage elements.

11 Claims, 4 Drawing Sheets

(56) References Cited

U.S. PATENT DOCUMENTS

Figure 1:
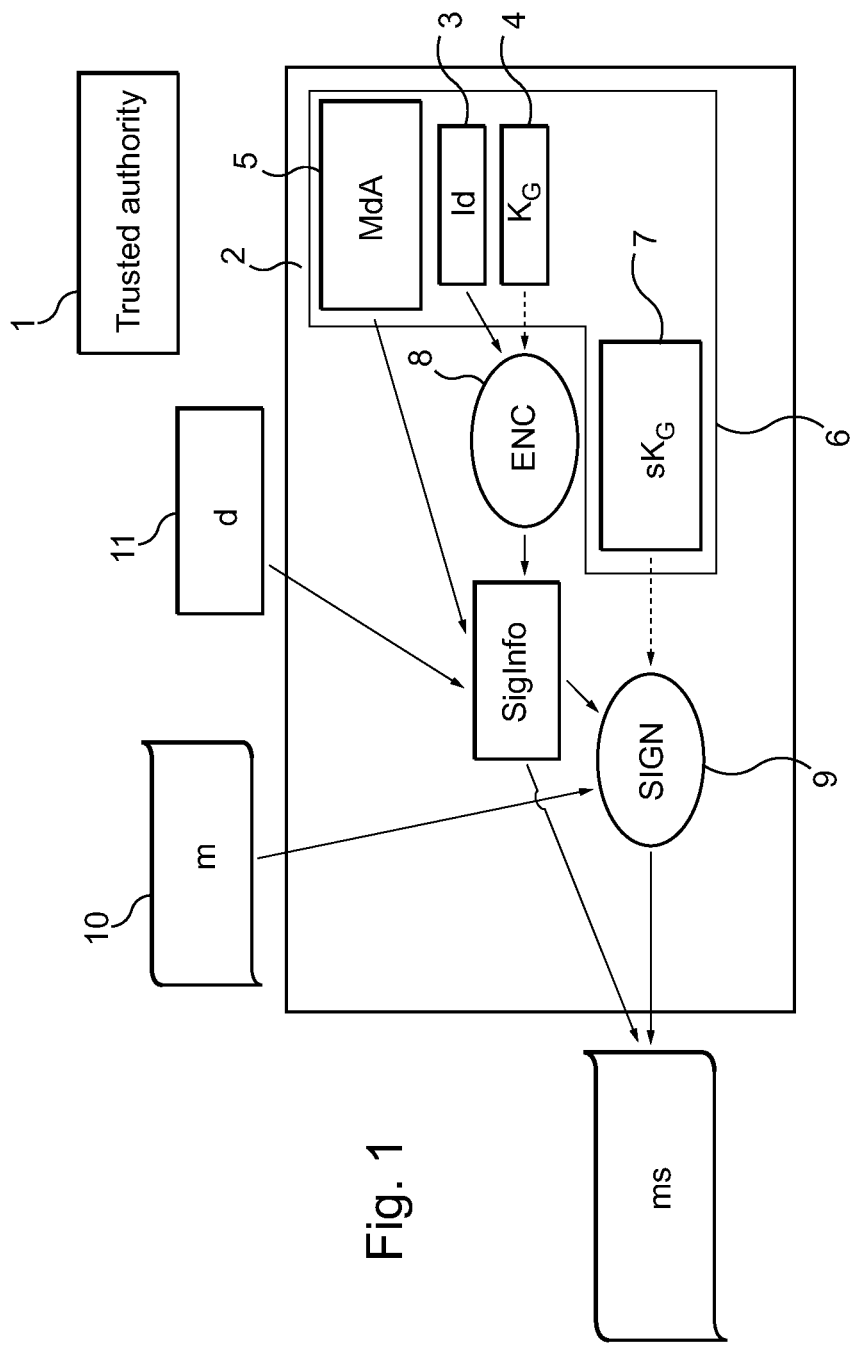

| | | | |
|---|---|---|---|
| 6,263,434 B1* | 7/2001 | Hanna et al. ............... 713/156 |
| 6,742,119 B1 | 5/2004 | Peyravian et al. |
| 2001/0049787 A1* | 12/2001 | Morikawa et al. ........... 713/156 |
| 2003/0041246 A1* | 2/2003 | Fischer ........................ 713/178 |
| 2003/0056093 A1* | 3/2003 | Huitema et al. ............. 713/156 |
| 2003/0101136 A1* | 5/2003 | Wheeler et al. ............... 705/42 |
| 2003/0110376 A1* | 6/2003 | Wiener et al. ............... 713/158 |
| 2003/0188167 A1* | 10/2003 | Kurosaki et al. ............ 713/176 |
| 2004/0148333 A1* | 7/2004 | Manion et al. ............... 709/201 |
| 2005/0071631 A1* | 3/2005 | Langer ......................... 713/156 |
| 2005/0081038 A1* | 4/2005 | Arditti Modiano et al. .. 713/176 |
| 2005/0097316 A1 | 5/2005 | Kim |
| 2005/0169461 A1 | 8/2005 | Canard et al. |
| 2006/0075245 A1* | 4/2006 | Meier .......................... 713/176 |
| 2007/0056034 A1* | 3/2007 | Fernstrom ..................... 726/20 |

OTHER PUBLICATIONS

Menezes, Alfred J. et al. "Handbook of Applied Cryptography," CRC Press LLC, 1997, pp. 426-427.*

* cited by examiner

METHOD AND DEVICE FOR CREATING A GROUP SIGNATURE AND RELATED METHOD AND DEVICE FOR VERIFYING A GROUP SIGNATURE

The present invention relates to a method for creating a group signature of a message, intended to be executed by a member of a group, to a method for verifying a group signature of a message, to a device, in particular a secure portable electronic entity (also known as a "smart card", for creating a group signature, and to a device for verifying a group signature.

The present invention is directed in particular to the electronic group signature.

The electronic group signature, also referred to as the digital signature, enables a member of a group to generate a signature such that the verifier can recognize that signature as being produced by a member of the group, without identifying that member, however, thereby guaranteeing the anonymity of the signatory.

However, the identity of the signatory is secret (anonymous) except for a trusted authority that has to identify the signatory if necessary (traceability). Thus the trusted authority can cancel the anonymity.

The existence of a group is reflected in allocating the group a public key referred to as the group key and allocating each member a private key associated with the group public key and an identifier, in particular an encrypted identifier. Using their private key and their identifier, a member can produce an anonymous group signature of a message of their choice.

As for the document or the message to be signed, this is in the digital format. The term "message" is used in the remainder of the description; however, it preferably designates any digital document, multimedia data, etc.

Note that a group signature can also be used for authentication. For this purpose, the signature is not generated in relation to a message but more generally in relation to data, for example a random value.

A group signature scheme must satisfy the following security properties. First of all, the property of correctness or rightness means that the verifier must accept the signatures of members of the group. The property of non-falsification means that only members of the group can sign messages in the name of the group. Then, the property of anonymity means that, given a valid message signature, identifying the signatory is very difficult. The property of there being no link between a member and their signatures is the property whereby the decision as to whether two different valid signatures were generated by the same member of the group is very difficult, except for the trusted authority. The property of not pleading ignorance means that neither a member of the group nor the authority of the group can sign in the name of other members of the group. Similarly, the property of traceability means that only the trusted authority of the group can always identify the signatory member from their signature. Finally, the last property is the property of coalition resistance. Thus a set of associated members of the group cannot generate a valid signature that the trusted authority of the group cannot link to the associated group members.

The electronic group signature can be based on a public key cryptography mechanism, i.e. the signatory signs using a group secret key, and the verifier verifies the signature using the corresponding group public key.

Thus the verifier can verify that the one of the members of the group signed using the group public key. This verification gives no information as to the identity of the signatory, however.

After a group has been constituted, it can evolve. New persons can become members of the group. A person is inserted into a group by allocating that person identification information and the private key of the group, the trusted authority also storing the information to the effect that this new person is part of the group. Insertion is therefore a simple matter.

Members of a group can also leave the group or be excluded from the group. This is referred to as revoking a member.

On each of these changes, the trusted authority is confronted with the problem of supplying to or withdrawing from a member of the group the means for producing an anonymous signature of the group. The problem arises from the necessity of withdrawing those means from a person. Various technical solutions to the revocation problem have been proposed.

For example, the document entitled "A practical and provably secure coalition-resistant group signature scheme", G. Ateniese, J. Camenish, M. Joye and G. Tsudik, in M. Bellare, editor, Advances in Cryptology—CRYPTO 2000, volume 1880 of Lectures Notes in Computer Science, pages 255-270, Springer-Verlag, 2000, discloses a signature scheme with revocation called the ACJT scheme.

That scheme is based on an RSA (Rivest, Shamir, Adleman) type signature scheme and a probabilistic encryption scheme such that if the same message is encrypted twice, the corresponding encrypted messages are different.

A trusted authority responsible for the group generates the encryption and signature keys and then makes the corresponding public keys available. It keeps the associated private keys secret.

To become a member of the group, an identifier is determined for a person who interacts with the trusted authority to obtain a member certificate that is in fact the signature of the identifier generated by the trusted authority from that person's private key.

To sign a message in the name of the group, the member encrypts their identifier using the public key of the trusted authority, which proves that the signatory is a member of the group at the time of signing. This scheme is therefore based on proofs of knowledge.

Verifying the signature consists in verifying the proof of knowledge.

The major drawback of such schemes is the amount of computation. Each signature necessitates encryption and a certain number of proofs of knowledge that are in practice very costly in terms of computation time because they use a dozen exponentiations. Note that approximately one second is required for each modular exponentiation with a smart card provided with a cryptographic processor.

Canard and Giraud, in the paper entitled "Implementing group signature scheme with smart cards", S. Canard and M. Girault, in CARDIS 2002, pages 1-10, USENIX, 2002, disclose a method for revoking a member of a group in which each member has a smart card for generating the group signature.

According to this scheme, the smart card is considered an "honest" entity that generates correct signatures even if the group member is not honest. The advantage of this scheme is that it necessitates only a few exponentiation operations (two or three exponentiations).

Two signature verification schemes are proposed in the above document. The first consists in the smart card verifying that its holder does indeed belong to the group with the trusted authority during the signature procedure. The second scheme consists in the verifier verifying that the signatory member does indeed belong to the group with the trusted authority before accepting the signature.

These two schemes have the following major drawback: verification that a member is a member of the group must be effected by consulting the trusted authority, either during signature or during verification Thus a connection to the trusted authority is always necessary. This is contrary to the basic idea of the smart card as a tool adapted to carry out security operations in a non-connected mode.

Moreover, in the second scheme described, the parameters of the group must be generated and distributed to all the smart cards when a member leaves the group. This therefore imposes a heavy load on the system to enable repudiation and causes problems of synchronization with all the smart cards at a given time.

The present invention is directed, firstly, to a method for creating a group signature of a message, to be executed by a member of a group in a system comprising a trusted authority, the group comprising at least said member provided with a secure portable electronic entity including storage means and computing means in which a cryptographic algorithm is installed, characterized in that it comprises the following steps:

generating via the computing means a signature of the message using a private key common to the members of the group and integrating data identifying the member of the group and temporal data representing temporal information regarding the time of the member's membership of said group and the date of the signing the message, the private key common to the members of the group, the identification data and the temporal data being stored in the storage means.

This method means that the group parameters remain the same throughout the life of the group whilst the secure portable electronic entities can sign messages, in particular without necessitating a connection to the trusted authority.

This method also keeps the private key of the group the same, even after revocation of a member of the group, which simplifies the group signature process. Thus the private key common to the members of the group can be static.

This solution is based on using a trusted authority to which the secure portable electronic entity is connected from time to time to confirm the member's membership of the group.

The problem of a member's membership of the group is solved by introducing into the message to be signed temporal information regarding the time of the member's membership of said group.

According to one feature, the temporal information regarding the time of the member's membership of said group comprises the date of the most recent connection of the member to the trusted authority.

According to this feature, the signed message comprises the date of the most recent connection and therefore of the most recent validation of the member's membership of the group.

According to another feature, said temporal data is determined by the difference between the date of the most recent connection of the member to the trusted authority and the date of signing the message.

According to one embodiment, the temporal information regarding the time of the member's membership of said group comprises the expiry date of the member's membership of said group.

According to one feature, the method is executed without connection to the trusted authority.

The signing process can be carried out without necessitating a connection to the trusted authority at the time of signing.

According to another feature the method comprises, prior to the creation of the signature, a step of the computation means encrypting the identification data of the member of the group.

According to one embodiment, this encryption consists in probabilistic encryption of the identification data.

According to one feature, this encryption uses a symmetrical key algorithm.

Such algorithms have the advantage of being fast.

In different embodiments, the secure portable electronic entity can be a smart card, an electronic passport including a secure microcontroller, a secure USB key, etc.

Another aim of the present invention is to provide a method of verifying a group signature of a message in a system comprising a trusted authority, the group comprising at least one member, characterized in that the method comprises the following steps:

verifying the signature by means of the public key of the group, extracting from the signature temporal data representing temporal information regarding the time of the signatory member's membership of said group and the date of signing the message, deciding on the validity of the signature as a function of the extracted temporal data.

In this verification method, the signature is validated or not as a function of the temporal information attached to the message to be signed, in particular without necessitating a connection to the trusted authority.

The temporal data provides temporal information regarding the time of signatory member's membership of the group and the date of signing the message, so that the validity of the signature can be decided on.

This method furthermore keeps the public key of the group the same, even after revocation of a member of the group, which simplifies the group signature process. Thus the public key can be static.

According to one feature, if the temporal data is greater than predetermined data, the method comprises a step of consulting said trusted authority regarding the member's membership of said group at the date of signing.

According to this feature, a connection can be established to the trusted authority in order to validate the signature, in particular if the temporal information is such that it is not possible to arrive at a decision regarding the member's membership of the group at the date of signing the message.

According to another feature the message comprises data identifying the signatory member.

According to a further feature the method is executed with no connection to the trusted authority.

According to one embodiment, the decision regarding the validity of the signature is also effected as a function of the nature of the message.

According to this feature, the reliance on the temporal information attached to the message can be of greater or lesser importance as a function of the nature of the message.

In a correlated way, the invention also provides a device for creating a group signature of a message, to be executed by a member of a group in a system comprising a trusted authority, the group comprising at least said member provided with a secure portable electronic entity comprising storage means and computation means in which a cryptographic algorithm is installed, characterized in that:

the computation means are adapted to generate a signature of the message by means of a private key common to the members of the group and integrating data identifying the member of the group and temporal data representing temporal information regarding the time of the member's membership of said group and the date of the signing the message, the private key common to the members of the group, the identification data and the temporal data being stored in the storage means.

This device has the same advantages as the creation method briefly described hereinabove.

Another aim of the present invention is to provide a device for verifying a group signature of a message in a system comprising a trusted authority, the group comprising at least one member, characterized in that the device comprises:

verification means adapted to verify the signature by means of the public key of the group, extraction means adapted to extract from the signature temporal data representing temporal information regarding the signatory member's membership of the group and the date of signing the message, decision means adapted to decide on the validity of the signature as a function of the extracted temporal data item.

This device has the same advantages as the verification method briefly described hereinabove.

Figure 2:
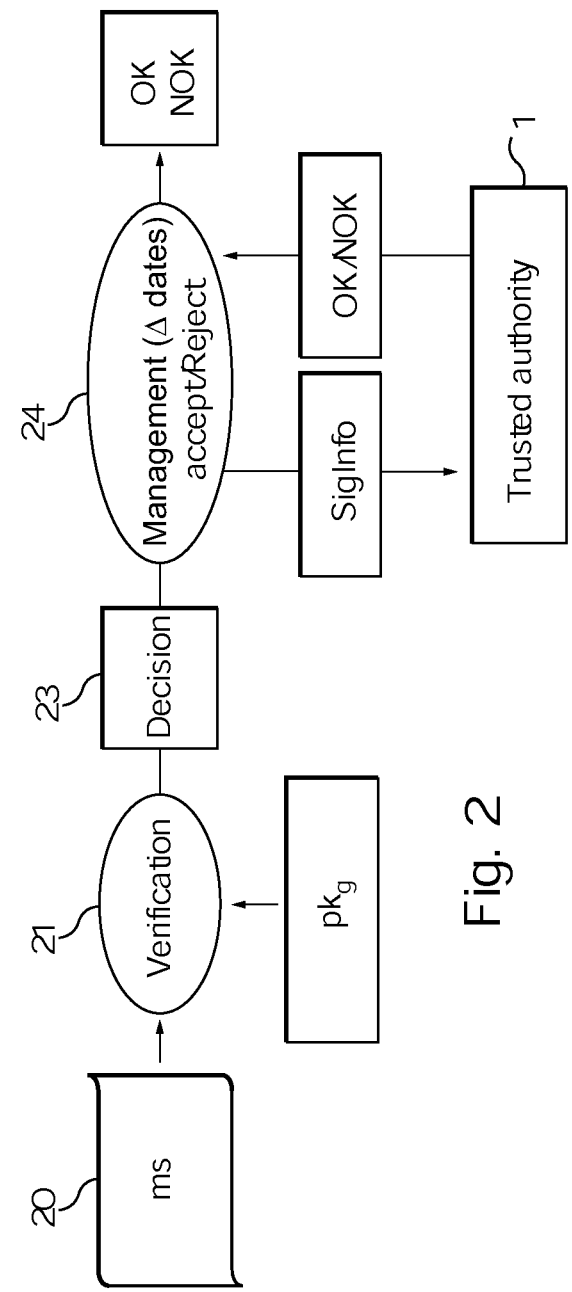
Figure 3:
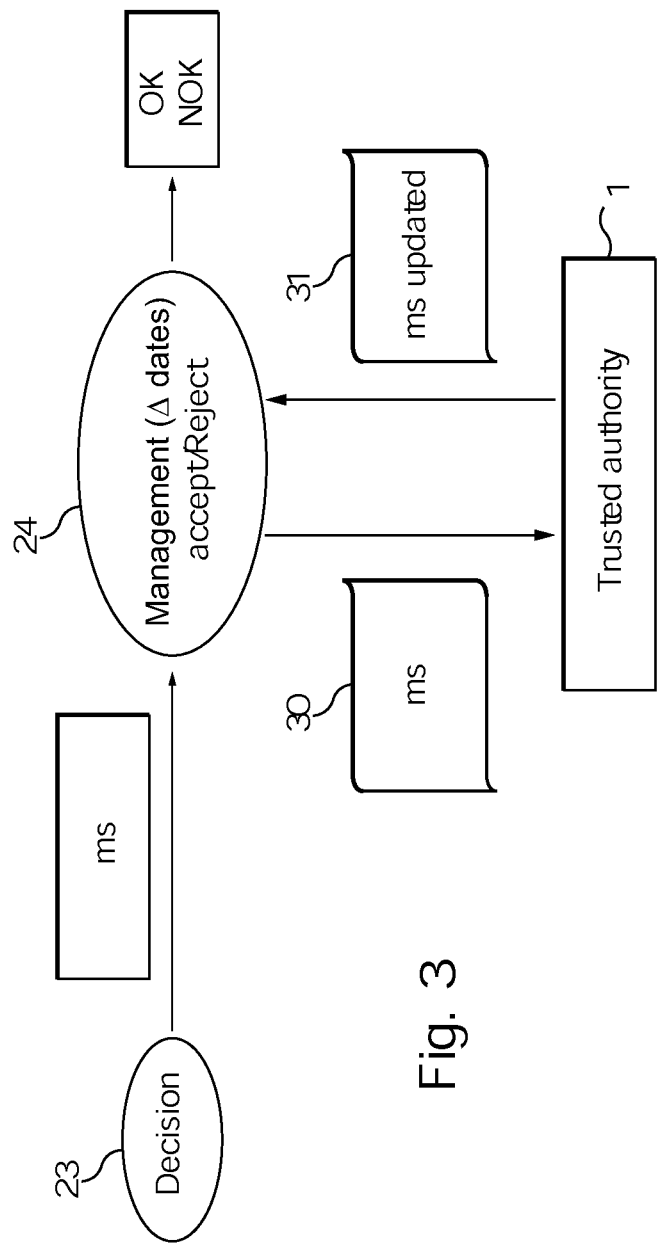
Figure 4:
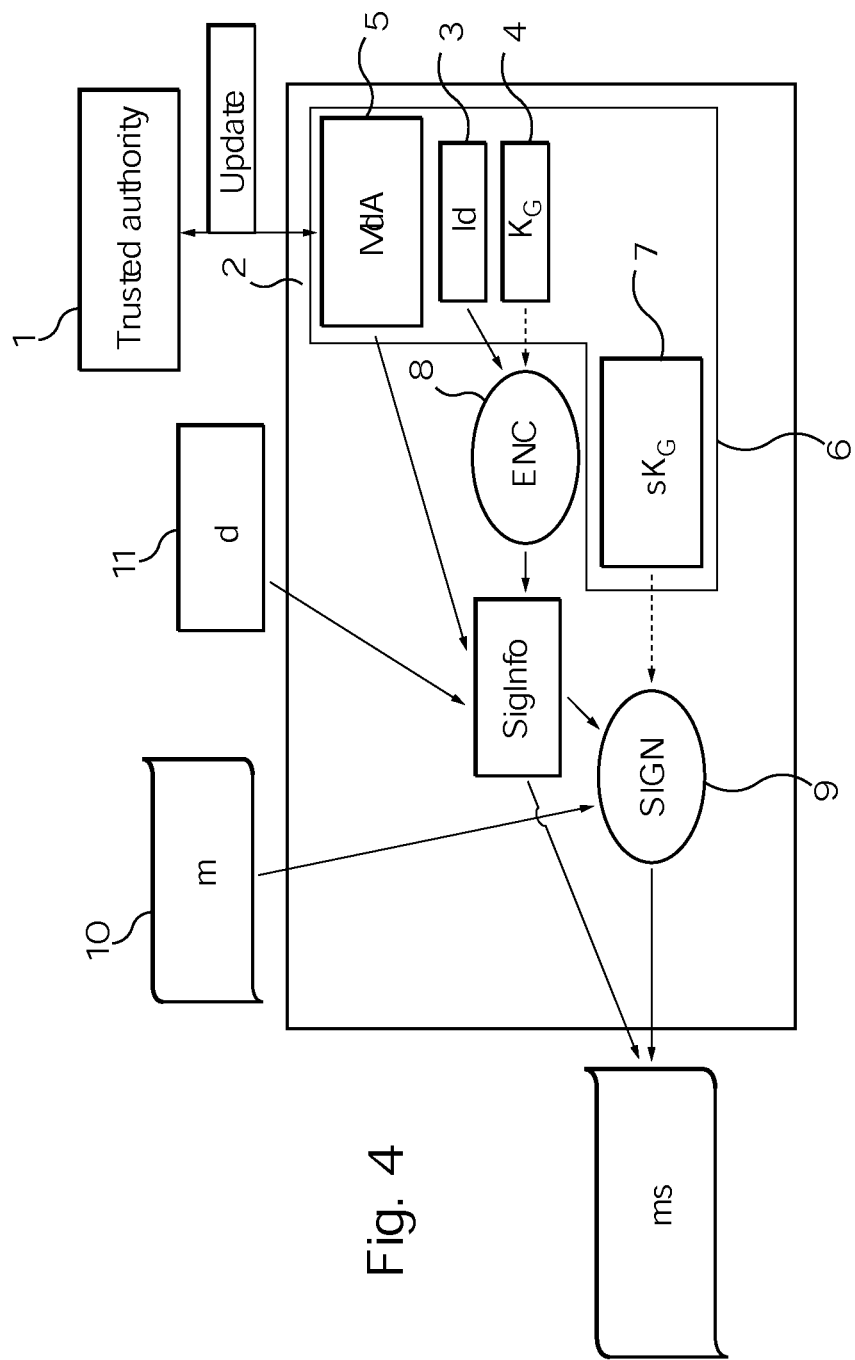

The invention and the advantages that stem from it will become more clearly apparent on reading the description of embodiments given by way of nonlimiting example only and with reference to the appended drawings in which:

FIG. 1 is a diagram showing generation in accordance with the invention of a group signature by a member of a signatory group, FIG. 2 is a diagram showing verification in accordance with the invention of a signature by the addressee of the message, FIG. 3 is a different embodiment of signature verification according to the invention, and FIG. 4 shows updating in accordance with the invention of temporal information giving the date of the most recent connection of the smart card to its trusted authority.

According to the invention, a member of a group is allocated a communicating secure portable electronic entity incorporating the identifier of the member.

In this embodiment, the secure portable electronic entity is typically a smart card, for example a smart card conforming to the 7816 standard.

The electronic entity can also be an electronic passport including a secure microcontroller that itself includes contactless communication means, the microcontroller being inserted into the thickness of one of the pages of the passport.

In a further embodiment, the secure portable electronic entity is a secure USB key.

The term smart card is adopted in the remainder of the description.

The smart card stores in electronic form identification data, in particular the identifier. It comprises computation means adapted to encrypt that data in order to mask it and means for generating the group signature for the combination of the message to be transmitted and the encrypted identification data.

Being deemed to be inviolable, the smart card can therefore be considered to be an "honest" entity, and cannot effect operations outside of the context in which it was designed. It is not possible to modify the secret information stored in the smart card or to disclose it in an unauthorized manner.

Thus using a smart card means that, if the smart card effects a calculation, the result can be considered to be exactly what was expected: there is no need to prove that it is correct, and the honest behavior of the signatory (now the smart card) cannot be called into question.

One embodiment uses a signature scheme based on a secret key (or private key) $sk_G$ and its associated public key $pk_G$. The parameter $sk_G$ is stored in non-volatile memory in the smart cards of the members of the group.

To enable traceability, i.e. for the trusted authority to be able to identify the signatory member, the identity of the signatory can be added to the message before their signature.

To preserve the anonymity of the signatory vis àvis the addressee of the message despite this, the identity can be encrypted with an encryption key known only to the trusted authority.

Given that the smart card is adapted to protect the secret information, the encryption algorithm can be symmetrical, but asymmetrical encryption is also appropriate. The smart cards of the members of the group can therefore share a symmetrical key with the trusted authority.

In order not to be able to deduce the signatory, signing the same message twice in succession can yield a different signature. Thus encryption of the identity of the signatory can be probabilistic.

With a personal signature, the date of signing is not relevant to the validity of the signature. A manual or electronic signature is proof of the consent of the physical person. This signature does not change over time and at any time links the signature to the signatory.

However, a member's membership of a group, especially a dynamic group, is defined by a clearly defined period of time. That period begins at a known date (that at which the member joins the group) and finishes at a precise date (that at which the member leaves the group).

Accordingly, when the verifier has to verify a signature, it must, on the one hand, check that the member is a member of the group and, on the other hand, that the signature is valid.

Moreover, a member may attempt fraudulently, on the one hand, to sign a message antedated to a date before that at which he/she joined the group and, on the other hand, to postdate a message to a date after the date on which he/she left the group.

The verifier must therefore be able to verify that the signature date is a date within the period of the signatory member's membership of the group.

The term "date" as used here means a calendar date, a time of day, data indicating a time relative to a reference date, and any other temporal data.

According to the invention, temporal data is inserted in the message to be signed, so that the verifier can easily make a decision as to whether or not the member was a member of the group at the date of signing. As a result, it is possible to prevent antedating or postdating.

The temporal data represents temporal information regarding the time of the member's membership of the group and the date of signing the message.

The knowledge that a member was a member of a group at a given time is stored by the trusted authority. However, as previously explained, verification by connection to the trusted authority as the drawback of necessitating a connection to the trusted authority for each verification or each signature.

Accordingly, according to the invention, the smart card therefore always signs the messages but adds, before the signature, information regarding its status in the group as of the date of signing before the signature. As a result, even if the smart card and the verifier cannot be connected to the trusted authority, the verifier can always take a decision regarding accepting the signature on the basis of the information transmitted by the signatory smart card.

Accordingly, in one embodiment, for the smart card to be able to prove that it is a member of the group, it regularly consults the trusted authority by connecting to it. The date of the most recent connection to the trusted authority with confirmation of membership of the group is stored in the smart card and is called the group membership validation date.

This temporal data reflects the member's status in the group.

In a first embodiment of the invention, the smart card inserts into the message the signing date and the group membership validation date. As a result, by comparing the two dates, the verifier can determine the probability of the signatory member membership of the group or not.

If the two dates are close together, for example fewer than five days apart, then the verifier can consider that the signatory was a member of the group at the date of signing and validate the signature. This temporal granularity is one of the criteria defining the signature validity test.

If not, the verifier can doubt whether the signatory member was a member of the group at the date of signing.

Two situations can then arise: the verifier either decides to invalidate the signature or connects to the trusted authority in order to determine if the signatory was a member of the group at the date of signing.

In the latter case, if the authority confirms that the signatory belonged to the group at the date of signing, then the verifier validates the signature. Otherwise, i.e. if the trusted authority indicates that the signatory no longer belonged to the group at the time of signing, the verifier rejects the signature.

This decision can also be taken as a function of the importance of the message. The greater the importance of the message, the more demanding the verifier as to the proximity of the two dates; it can even consult the trusted authority automatically, where appropriate. The lower the importance of the message, the more signatures will be accepted by the verifier in which the two dates are far apart.

Thus, if the verifier finds the elapsed time between the two dates unacceptable (because too long), it can connect to the trusted authority in order to confirm the signatory's membership of the group at the time of signing.

For example, validating the signature of a message of high commercial value, for example a contract type message involving a high monetary value, is based on a low temporal granularity. Accordingly, for this kind of message, if the delay between the two dates is greater than the defined temporal granularity, then the verifier can connect to the trusted authority to validate or invalidate the signature.

According to the invention, the verifier is therefore able to determine the validity of the signature without necessarily being connected to the trusted authority.

FIG. 1 shows a signature system of this kind. The system consists of a trusted authority 1 and a smart card 2 for each member of a group. The smart card stores the member's identifier (Id) 3, a symmetrical encryption key ($K_G$) 4 for the identifier and the date of validating membership of the group 5 in the non-volatile memory 6 of the smart card 2. This memory also contains the private key $sk_G$ 7 of the group.

The smart card 2 also contains probabilistic encryption means 8 and signature generation means 9.

The smart card having to sign a message receives at its input the message m 10 and a signature date d 11.

The following operations are carried out during the process of signing the message m.

First of all, the smart card encrypts the identifier of the member:

$$C \leftarrow ENC(Id, K_G)$$

where ENC (x, $K_G$) is the probabilistic encryption of a message x using the key $K_G$.

The smart card then creates the signature using the signature means 9:

$$s \leftarrow SIGN(m\|d\|MdA\|C, sk_G)$$

Output $(m\|d\|MdA\|C, s)$ where SIGN(X, $sk_G$) is the function creating a signature, in particular an RSA or DSA signature, of the message x using the asymmetrical secret key $sk_G$ and MdA is the date of validating that the member is a member of the group.

This solution does not necessitate a connection to the trusted authority at the time of signing.

On receipt of a signed message, the verifier first verifies that the signature is correct using the group public key $pk_G$. It then compares the two dates to decide if the time interval between the most recent connection of the smart card to the trusted authority and the date of signing the message is acceptable given the importance of the document and the risk incurred.

FIG. 2 shows this kind of verifier. It receives a signed message ms and submits that message to the verification means 21. These verify the signature using the group public key $pk_G$ 22. The decision means 23 determine if the two dates are relatively close, which gives reason to believe that the signatory member belonged to the group, with a high probability, at the date of signing. Otherwise, i.e. if the two dates are too far apart, the decision means 23 refers the decision to the management means 24.

To validate the signatory member's membership of the group at the date of signing, the management means 24 consult the trusted authority by setting up a connection, in particular a secure connection. The consultation query includes the date of signing the message and the encrypted identifier of the signatory, and even the date of validating the signatory member's membership of the group.

As a result, the trusted authority has all the information it needs to determine unambiguously if the member was a member of the group or not at the date of signing the message.

In a different embodiment of signature verification, as shown in FIG. 3, the decision means 23 send the management means 24 the signed message ms so that the management means can verify the member's membership of the group by sending the trusted authority the signed message. This verification is effected only if the decision means and the management means consider the two dates to be far apart.

At the time of sending the signed message 30 to the trusted authority 1, the authority updates the message by modifying the dates so that on the next verification of the signature by the addressee of the message the addressee can validate the signature immediately.

Once modified, the updated signed message 31 is forwarded to the addressee of the message and the management means are thus able to validate or invalidate the signature.

FIG. 4 shows the updating in the smart card of the most recent date of consulting the trusted authority.

The smart card 2 must be connected regularly to the trusted authority 1 so that the group membership validation date is updated, thereby validating that the member holding the smart card is a member of the group.

This updating is effected, for example, when the holder of the smart card gets to work and inserts his smart card into a smart card reader on his desk, for example. They can then sign new messages, for example contracts, when on the move, without being connected to his company.

In a different embodiment of the invention, the temporal data inserted into the message before it is signed is a duration (i.e. a period of time) corresponding, for example, to the difference between the date of signing and the date of the most recent consultation of the trusted authority. As a result, only one additional item of information is inserted into the message to be signed.

In a different embodiment, the temporal data comprises the expiry date of the member's membership of the group and the date of signing the message. This data is stored in the smart card of the member and is updated when the smart card is connected to the trusted authority. As a result, the trusted authority certifies the member's membership of the group up to the expiry date.

Different expiry dates can be defined as a function of the nature of the message to be signed, for example as a function of the monetary value that the message represents.

As a function of the importance of the message and the time between the time of the signing the message and the expiry date of the member's membership of the group, the recipient of the message determines whether to validate the signature or not. They can also decide to consult the trusted authority, to confirm the member's membership of the group at the time of signing.

The invention claimed is:

1. A method of verifying a group signature of a message in a system comprising a trusted authority, the group comprising at least one member, comprising the steps of:
    verifying the signature by means of a public key of the group, the signature being computed based on digital content, the digital content comprising the message, data identifying the member of the group, temporal data representing temporal information regarding a time of the member's membership of said group, and a date of signing the message;
    extracting from the signature the temporal data representing temporal information regarding the time of the signatory member's membership of said group, and the date of signing the message; and
    deciding on the validity of the signature as a function of the extracted temporal data by comparing a date of the most recent connection of the member to a trusted authority and the date of signing the message to determine whether a time interval between these two dates is acceptable.

2. The method according to claim 1, wherein, upon the temporal data being greater than predetermined data, the method comprises a step of consulting said trusted authority regarding the member's membership of said group at the date of signing.

3. The method according to claim 1, wherein the message comprises data identifying the signatory member.

4. The method according to claim 1, wherein the steps of the method are executed with no connection to the trusted authority.

5. The method according to claim 1, the message having a nature, wherein the decision regarding the validity of the signature is also effected as a function of the nature of the message.

6. The method according to claim 1, wherein the public key of the group is static.

7. A device for verifying a group signature of a message in a system comprising a trusted authority, the group comprising at least one member, comprising:
    verification means adapted to verify the signature by means of the public key of the group, the signature being computed based on digital content, the digital content comprising the message, data identifying the member of the group, temporal data representing temporal information regarding a time of the member's membership of said group, and a date of signing the message;
    extraction means adapted to extract from the digital content the temporal data representing temporal information regarding the time of the signatory member's membership of the group and the date of signing the message; and
    decision means adapted to decide on the validity of the signature as a function of the extracted temporal data item by comparing a date of the most recent connection of the member to a trusted authority and the date of signing the message to determine whether a time interval between these two dates is acceptable.

8. The device according to claim 7, comprising means for consulting said trusted authority on the member's membership of said group at the date of the signature.

9. The device according to claim 7, wherein the message comprises data identifying the signatory member.

10. The device according to claim 7, the message having a nature, wherein the decision means as to the validity of the signature are adapted also to decide as a function of the nature of the message.

11. The device according to claim 7, wherein the public key of the group is static.

* * * * *

UNITED STATES PATENT AND TRADEMARK OFFICE
CERTIFICATE OF CORRECTION

PATENT NO. : 8,661,251 B2  Page 1 of 1
APPLICATION NO. : 12/090484
DATED : February 25, 2014
INVENTOR(S) : Prouff et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 947 days.

Signed and Sealed this

Twenty-ninth Day of September, 2015

Michelle K. Lee
*Director of the United States Patent and Trademark Office*